Figure 1:
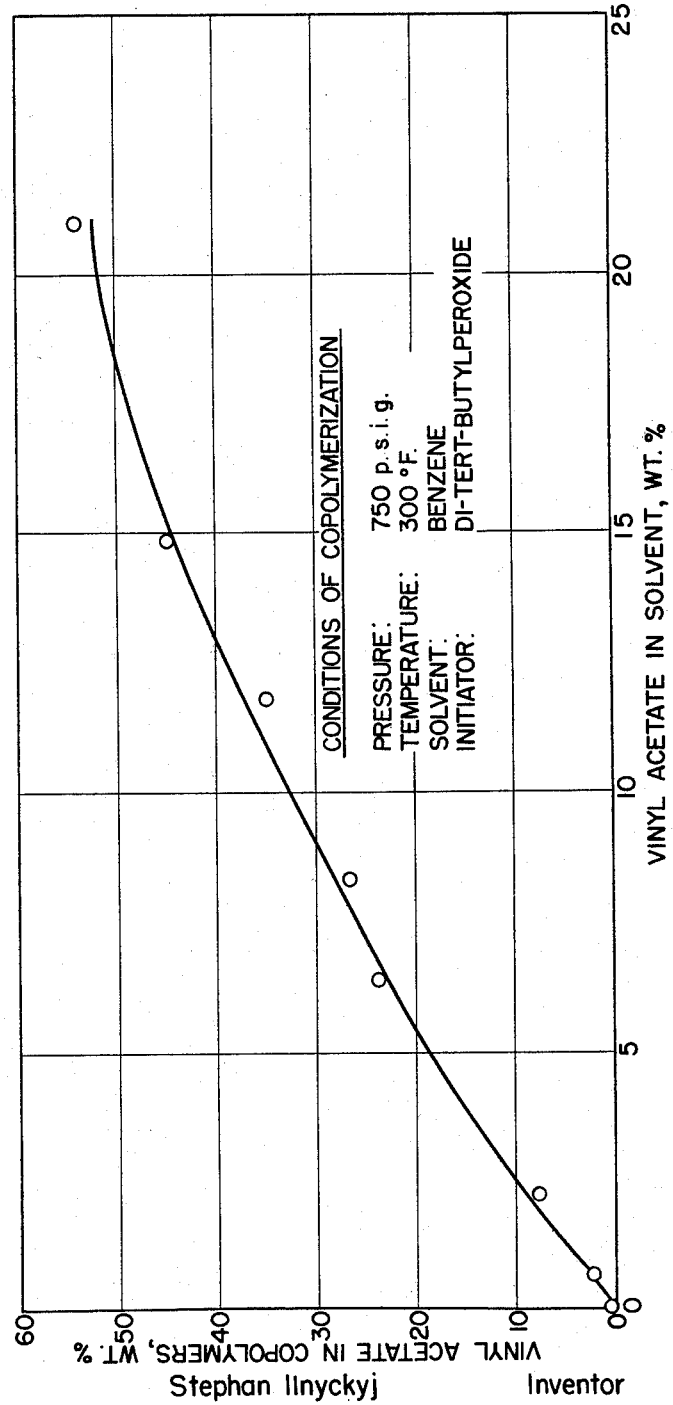

EFFECT OF VINYL ACETATE CONTENT OF COPOLYMER

EFFECT OF VINYL ACETATE CONTENT ON POUR DEPRESSING POTENCY OF COPOLYMER

Stephan Ilnyckyj   Inventor

United States Patent Office 3,093,623
Patented June 11, 1963

3,093,623
PROCESS FOR THE MANUFACTURE OF IMPROVED POUR DEPRESSANTS FOR MIDDLE DISTILLATES
Stephan Ilnyckyj, Sarnia, Ontario, Canada, assignor to Esso Research and Engineering Company, a corporation of Delaware
Filed Jan. 5, 1960, Ser. No. 1,838
3 Claims. (Cl. 260—87.3)

The present invention is concerned with the manufacture of improved pour depressants, particularly, for use with middle distillates. The pour depressant of the present invention comprises copolymers of ethylene with up to about 50% by weight of an olefinically unsaturated aliphatic monomer containing from about 3 to 5 carbon atoms per molecule. The copolymers of a particular average molecular weight are obtained by controlling the conditions of reaction. The preferred copolymer of the present invention is a particular copolymer of ethylene and vinyl acetate.

The present application is a continuation-in-part of Serial No. 835,587, filed August 24, 1959, now abandoned, entitled "Process for the Manufacture of Improved Pour Depressants for Middle Distillates," Stephan Ilnyckyj.

With the increase in the use of hydrocarbon fuels of all kinds, a serious problem has arisen in areas frequently subjected to low temperatures in the cold test characteristics of fuels. Particularly, serious problems have been encountered with heating oils and diesel and jet fuels that have too high a pour point, resulting either in distributional or operating difficulties or both. For example, the distribution of heating oils by pumping or syphoning is rendered difficult or impossible at temperatures around or below the pour point of the oil. Furthermore, the flow of the oil at such temperatures through the filters cannot be maintained, leading to the failure of the equipment to operate.

Also the low temperature properties of petroleum distillate fuels boiling in the range between about 250° and about 750° F. have attracted increasing attention in recent years because of the growth of market for such fuels in subarctic areas and because of the development of turbo-jet aircraft capable of operating at altitudes where temperatures of −50° F. or lower may be encountered.

It is, therefore, an object of the present invention to set forth an improved process for the manufacture of very effective pour depressants for middle distillates and lighter oils. In general, these oils boil in the range from about 250° to 750° F.

It is a still further object of the present invention to provide heating oils, diesel fuel oils, kerosines and jet fuels having low pour points. Aviation turbo-jet fuels in which the polymers may be used normally boil between about 250° and about 550° F. and are used in both military and civilian aircraft. Such fuels are more fully defined by U.S. Military Specifications MIL–F–5624C, MIL–F–25554A, MIL–F–25558A, and amendments thereto. Kerosines and heating oils will normally have boiling ranges between about 300° and about 750° F. and are more fully described in ASTM Specification D–396–48T and supplements thereto, where they are referred to as No. 1 and No. 2 fuel oils. Diesel fuels in which the polymers may be employed are described in detail in ASTM Specification D–975–53T and later versions of the same specification.

The process of the present invention produces copolymers of ethylene and up to about 50% by weight of an olefinically unsaturated aliphatic monomer containing from about 3 to 5 carbon atoms per molecule. In general, these compounds may comprise vinyl acetate, vinyl propionate, methyl methacrylate, allyl ethyl ether, divinyl ether, acrylonitrile, vinylacetonitrile and the like.

The preferred copolymers comprise ethylene-vinyl acetate copolymer. It is preferred that the parts by weight of ethylene in the copolymer be in the range from about 60 to 99% as compared to parts by weight of vinyl acetate in the range from about 40 to about 1%. A very desirable polyethylene vinyl acetate copolymer contains about 15 to 28% by weight of vinyl acetate, as for example, about 20 parts by weight of vinyl acetate.

The molecular weights of the ethylene-vinyl acetate copolymer are critical and should be in the range from about 1,000 to 3,000, preferably, in the range from about 1,500 to 2,200. The molecular weights are determined by K. Rast's method (Ber. 55, 1051, 3727 (1922)).

The ethylene-vinyl acetate copolymer as described above is used in a concentration in the range from about .001 to 0.2% by weight, preferably, in a concentration in the range from about .005 to .1% by weight.

In accordance with the present invention, the polymerization process is conducted in a solvent as, for example, toluene or hexane. It is preferred, however, to use a benzene solvent. The initiator comprises any peroxy compound, preferably, di-tertiary-butyl-peroxide. The temperature of the polymerization reaction is in the range from about 280° to 340° F. A very desirable temperature is about 300° F. The pressure is in the range from about 700 to 2,000 pounds, preferably, 800 or 900 pounds. The autoclave or similar equipment containing the solvent, initiator and vinyl acetate is purged with nitrogen, then with ethylene before charging with a sufficient amount of ethylene to yield the desired pressure when heated to the reaction temperature. During the polymerization, additional ethylene is added to maintain the pressure at the desired level. Polymerization is considered complete when the pressure drops less than 50 p.s.i.g. per hour. The product is stripped free of solvent and unreacted vinyl acetate under vacuum.

A number of operations were carried out wherein copolymers were produced under different pressures and other varying conditions. These copolymers were then tested as pour depressants in a blend of virgin gas oil and a catalytically cracked gas oil having an ASTM pour of +20° F. The virgin gas oil boiled in the range from about 350° to 700° F., and the cracked gas oil boiled in the range from about 350° to 650° F. As pointed out heretofore, the critical factors with respect to producing desirable polymers are the molecular weights and the concentration of the vinyl acetate in the polymer. The results of these tests are shown in the following Table I:

TABLE I

*Synthesis of Copolymers of Ethylene and Vinyl Acetate*

[Conditions of polymerization: 300° F., di-tert-butylperoxide initiator, benzene solution]

| Run No. | Vinyl acetate conc., weight, percent | | Pressure, p.s.i.g. | Yield, grams per gram peroxide | Molecular weight | ASTM pour point,[1] ° F. | | | |
|---|---|---|---|---|---|---|---|---|---|
| | In benzene | In product | | | | 0.05% | 0.1% | 0.25% | 0.5% |
| 1 | | 7.5 | | | 800 | 0 | −25 | −50 | −40 |
| 2 | Nil | Nil | 750 | 19 | 690 | +5 | 0 | −25 | −70 |
| 3 | .53 | 3.0 | 750 | 18 | | +5 | 0 | −50 | <−70 |
| 4 | 2.1 | 8.4 | 750 | 17.5 | 770 | 0 | −10 | <−70 | <−70 |
| 5 | 8.5 | 28.1 | 750 | 22.5 | | +10 | −25 | <−70 | <−70 |
| 6 | 2.1 | 5.8 | 900 | 23 | 1,170 | 0 | −20 | <−70 | −60 |
| 7 | 2.1 | 17.9 | 400 | 9 | 500 | +15 | +10 | +10 | 0 |
| 8 | 2.1 | 12.1 | 600 | 14 | 560 | +15 | +5 | −15 | −70 |
| 9 | 21.0 | 53.8 | 750 | 31 | | +20 | +20 | +20 | +10 |
| 10 | 14.8 | 44.7 | 750 | 26 | 1,210 | +15 | +15 | +10 | +10 |
| 11 | 11.7 | 35.2 | 750 | 23.5 | | +10 | +10 | −60 | −70 |
| 12 | 6.3 | 24.3 | 750 | 18 | 1,235 | +10 | −50 | <−70 | −60 |
| 13 | 6.3 | 20.4 | 850 | 25 | 1,750 | −40 | <−70 | <−70 | −40 |
| 14 | 6.3 | 14.7 | 1,600 | 29.5 | 1,380 | −10 | <−70 | <−70 | <−70 |

[1] 50/50 blend of virgin gas oil and cat. cracked gas oil, ASTM pour +20° F.

From the above, it is apparent that copolymer containing 3% vinyl acetate is much superior to an ethylene polymer containing no vinyl acetate (run No. 3 vs. run No. 2). It is also apparent that a concentration of vinyl acetate approximately of 28% is very effective (run No. 5), and that when the vinyl acetate concentration exceeds about 40%, the effectiveness of the additive is greatly decreased (runs No. 9 and 10).

Figure 3:
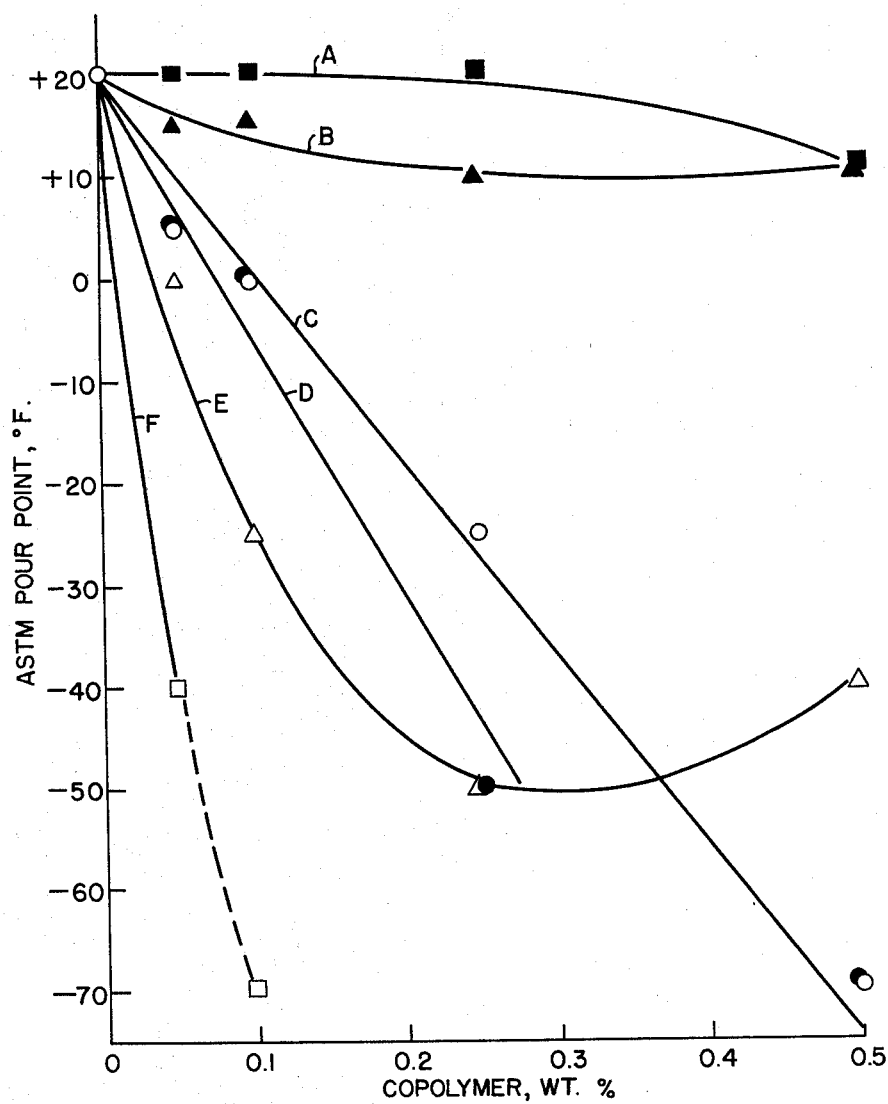

Reference is made to FIGURE 3 which shows the potency of the copolymers as pour depressants for middle distillates. The middle distillate was identical with that specified with respect to Table I. Curves A, B, C, D, E and F correspond to run Nos. 9, 10, 2, 3, 1 and 13, respectively, of Table I. Summarizing as follows:

| Curve | Percent V.A. | Run No. |
|---|---|---|
| A | 53.8 | 9 |
| B | 44.7 | 10 |
| C | 0 | 2 |
| D | 3.0 | 3 |
| E | 7.5 | 1 |
| F | 20.4 | 13 |

It is to be noted that curve F, containing about 20% of vinyl acetate was very effective.

As a matter of fact, the copolymer containing about 20% by weight of vinyl acetate (curve F) was about three times as potent as the copolymer which contained 7.5% by weight of vinyl acetate (curve E). However, a copolymer containing 54% by weight of vinyl acetate was quite ineffective as a pour depressant. It is of interest to note that at a higher concentration, a homopolymer of ethylene also gave a considerable reduction in pour.

Figure 4:
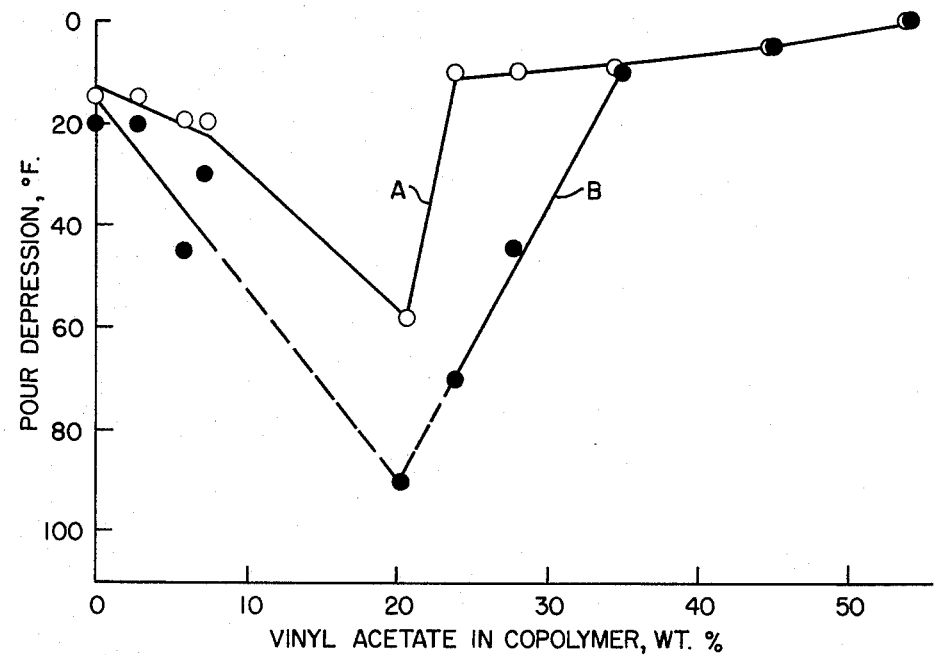

Reference is made to FIGURE 4. This figure illustrates the relationship of the potency of the pour depressants to their vinyl acetate content. Curve A contains .05% pour depressant, whereas, curve B contains 0.1% pour depressant. It is to be noted that the most potent pour depressant was obtained at 850 p.s.i.g. when the copolymer contained about 80% ethylene and 20% vinyl acetate. It is to be noted from FIGURE 4 that copolymers containing more than 20% vinyl acetate show a drop in pour depressing activity. This is particularly pronounced at lower concentration of the additive. At 0.05% concentration, the activity of pour depressants becomes negligible when the copolymer contains about 24% of vinyl acetate. At 0.1% concentration, the copolymers show some pour depressing activity until the vinyl acetate amounts to about 35% of the total polymer.

The effect of molecular weight on potency of pour depressants is illustrated in the following Table II. Both polymers had about 20% by weight of vinyl acetate. However, polymer A was synthesized at 850 p.s.i. and polymer B at 400 p.s.i. The corresponding molecular weights of products were about 1750 and 500, respectively. Pour points of heating oil shown in the table indicate that the polymer with the lower molecular weight is relatively a very poor pour depressant. It is possible that the failure of the low weight molecular material to depress pour results from its solubility in an oil at temperatures at which n-paraffins start to precipitate.

TABLE II

*Effect of Molecular Weight on Pour Depressing Potency of Vinyl Acetate-Ethylene Copolymers*

| | Polymer A | Polymer B |
|---|---|---|
| Molecular weight | 1,750 | 500 |
| Vinyl acetate, weight percent | 20.4 | 17.9 |

ASTM POUR POINT OF STANDARD OIL, ° F.

| Copolymer, weight percent: | | |
|---|---|---|
| Nil | +20 | |
| 0.05 | −40 | +15 |
| 0.1 | Below −70 | +15 |
| 0.25 | Below −70 | +10 |
| 0.5 | −40 | 0 |

Reference is made to FIGURE 1 which shows that at a constant pressure, the percentage of vinyl acetate in the copolymer increases with increasing concentration of this chemical in the benzene. The copolymerization was carried out at a pressure of 750 p.s.i.g., at a temperature of 300° F., utilizing benzene as a solvent and di-tertiary-butyl-peroxide as the initiator.

Figure 2:
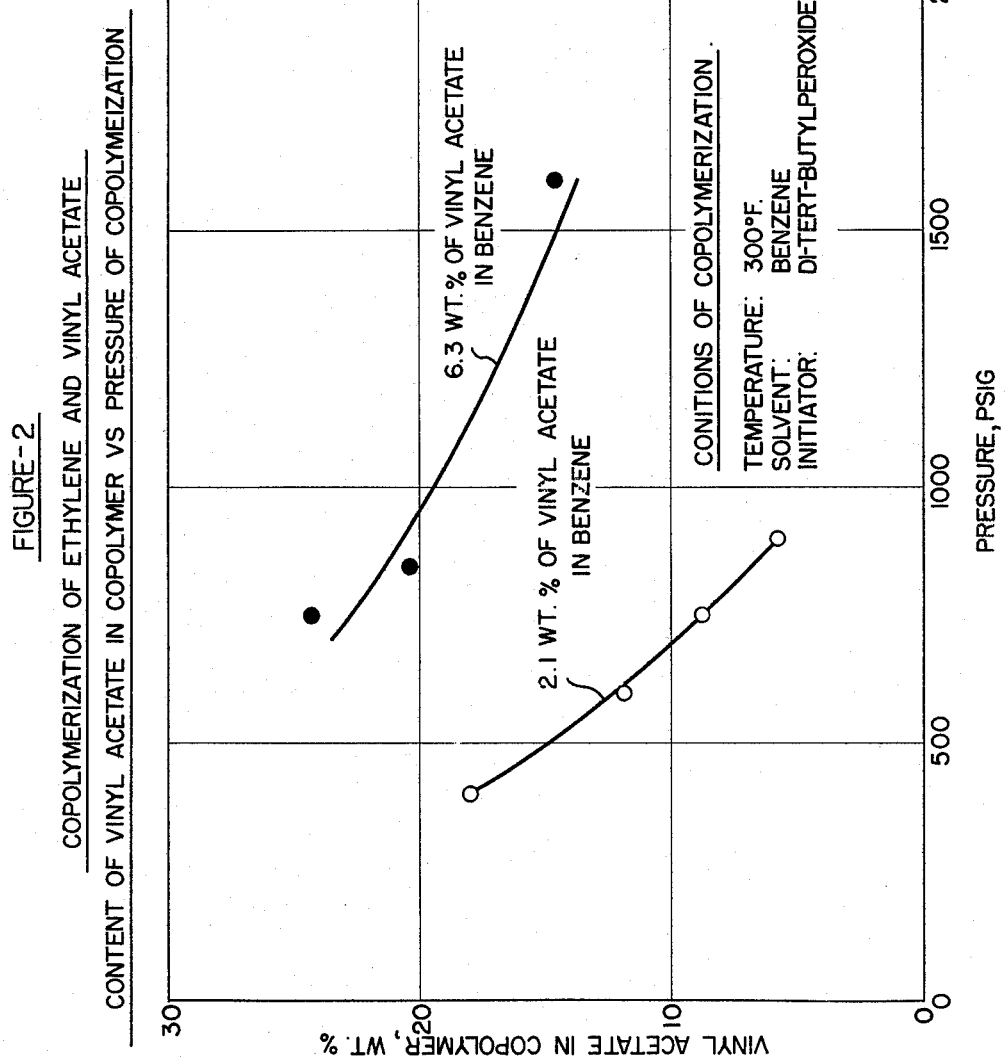

Reference is made to FIGURE 2 which illustrates that at a constant concentration of vinyl acetate in the solvent, the ratio of vinyl acetate in the polymer decreases with increasing partial pressure of ethylene. The concentrations of the vinyl acetate utilized in the solvent were: 2.1 wt. percent and 6.3 wt. percent. Other conditions were identical with those specified with respect to FIGURE 1.

A number of operations were conducted using various solvents. From the following data of Table III, it is evident that saturated hydrocarbons or alkylated aromatic hydrocarbons are not suitable solvents for the synthesis of the pour depressant of the present invention.

TABLE III

*Effect of Solvent on Yield and Quality of Pour Depressant*

[Polymerization conditions: 850 p.s.i.g., 300° F., 6.3 wt. percent V.A. in benzene, di-t-butyl-peroxide initiator]

| Run | A | B | C |
|---|---|---|---|
| Solvent | Benzene | Toluene | Naphtha (360°–410° F.) |
| Yield, g | 100 | 34.2 | 65.5 |
| Yield, g./g. peroxide | 25 | 8.5 | 16.4 |
| Consistency | Grease | Liquid | Liquid |

ASTM POUR POINT OF SARNIA HEATING OIL, °F.

| Weight percent pour depressant: | | | |
|---|---|---|---|
| Nil | +20 | | |
| 0.05 | −40 | +15 | +15 |
| 0.1 | <−70 | +15 | +10 |

In other operations, reactants were continuously fed to the reactor. In the first phase of this operation, vinyl acetate was charged into the reactor at the start of each run and di-tertiary-butyl-peroxide in 25% concentration in benzene was fed continuously as the copolymerization proceeded. Table IV compares products obtained with the best copolymer A, produced when all reactants were charged to the reactor at the beginning of the reaction.

The effect of reaction variables on yield and potency of pour depressant was studied in some detail. Generally it was found that the yield of copolymer increased with polymerization time, slower rate of addition of initiator, and increases in pressure. In the range studied, the highest potency pour depressant was obtained when operating at 650 p.s.i.g. and using short polymerization times with fast addition of peroxide. When considering both yield and quality of pour depressant, the best product was obtained at 900 p.s.i.g., 300° F., 3 hours total polymerization time and 1 hour addition time of peroxide.

TABLE IV

*Pilot Copolymerization Of Ethylene and Vinyl Acetate*

[All vinyl acetate charged at start, incremental addition of peroxide]

| Operation | A | B | C | D | E | F | G | H | I |
|---|---|---|---|---|---|---|---|---|---|
| Reactor | (1) | (2) | (2) | (2) | (2) | (2) | (2) | (2) | (2) |
| Conditions: | | | | | | | | | |
| Vinyl acetate, ml | 30 | 150 | 150 | 150 | 150 | 120 | 120 | 120 | 90 |
| Peroxide, ml | 5 | 15 | 15 | 15 | 15 | 15 | 15 | 15 | 15 |
| Peroxide addition, hrs | 0 | 4 | 1 | 1 | 1 | 1 | 1 | 1 | 1 |
| Polymerization, hrs | 6 | 6 | 6 | 3 | 3 | 3 | 6 | 6 | 6 |
| Pressure, p.s.i.g | 850 | 900 | 900 | av. 1,200 | 900 | 650 | 650 | 650 | 550 |
| Temperature, °F | 300 | 300 | 300 | 300 | 300 | 300 | 300 | 280 | 300 |
| Product: | | | | | | | | | |
| Yield | 100 | 731 | 615 | 585 | 530 | 414 | 434 | 396 | 352 |
| Initiator efficiency | 25 | 51.4 | 51.7 | 49.2 | 44.5 | 34.8 | 36.5 | 33.3 | 29.5 |
| Vinyl acetate, weight percent | 20.4 | 15.8 | 20.6 | 18.8 | 21.9 | 22.8 | 21.0 | 21.9 | 20.9 |
| Pour depression, °F.: | | | | | | | | | |
| 0.05 weight percent | 60 | 25 | 50 | 40 | 60 | 65 | 50 | 75 | 15 |
| 0.1 weight percent | >90 | 40 | 80 | 65 | 80 | >100 | 90 | >90 | 80 |
| Vinyl acetate balance: | | | | | | | | | |
| Polymerized, weight percent | 72.9 | 87.5 | 90.6 | 78.7 | 83.0 | 84.4 | 81.3 | 77.5 | 87.4 |
| Recovered monomer, weight percent | | 4.9 | 8.2 | 7.9 | 13.3 | 11.3 | 4.7 | | 7.6 |
| Unaccounted for, weight percent | 27.1 | 7.6 | 1.2 | 13.4 | 3.7 | 4.2 | 14.0 | | 5.0 |

[1] 2 litres.  [2] 1 gallon.

Further improvements in the process were obtained when the vinyl acetate was continuously added to the reactor as the polymerization reaction proceeded. These runs are shown in Table V.

TABLE V

*Pilot Copolymerization of Ethylene and Vinyl Acetate*

[Incremental addition of vinyl acetate and peroxide, 900 p.s.i.g., 300° F.]

| Operation | A | B | C[1] | D[2] | E[2] | F[2] | G | H[3] |
|---|---|---|---|---|---|---|---|---|
| Conditions: | | | | | | | | |
| Benzene, ml | 1,395 | 315 | 330 | 1,395 | 345 | 405 | 1,290 | 7,740 |
| Vinyl acetate, total ml | 150 | 150 | 150 | 150 | 150 | 150 | 300 | 1,800 |
| Vinyl acetate, at start, ml | 150 | 30 | 15 | 150 | 0 | 0 | 0 | 0 |
| Vinyl acetate, balance ml./min | 0 | 2.0 | 1.1 | 0 | 2.5 | 2.5 | 5 | 15 |
| Di-t-butylperoxide, total ml | 15 | 15 | 15 | 15 | 15 | 15 | 30 | 180 |
| Di-t-butylperoxide, ml./min | 0.25 | 0.25 | 0.25 | 0.25 | 0.25 | 0.125 | 0.25 | 1.0 |
| Polymerization time, hrs | 3 | 3 | 6 | 3 | 3 | 3 | 3 | 3.5 |
| Product: | | | | | | | | |
| Yield, g | 530 | 343 | 344 | 477 | 314 | 345 | 810 | 6,700 |
| Yield, g./g. peroxide | 44.5 | 28.9 | 28.9 | 40.0 | 26.3 | 29.0 | 34.0 | 46.9 |
| Vinyl acetate, weight percent | 21.9 | 34.0 | 33.5 | 22.7 | 27.6 | 31.1 | 29.8 | 23.5 |
| Pour depression, °F.[4] | | | | | | | | |
| 0.05 weight percent | 60 | 55 | 45 | 50 | 35 | 75 | >80 | >90 |
| 0.1 weight percent | 80 | >85 | 70 | >90 | 90 | 90 | >80 | >90 |
| Vinyl acetate balance: | | | | | | | | |
| Polymerized, weight percent | 83.6 | 83.4 | 82.4 | 77.4 | 77.4 | 77.1 | 86.2 | 93.9 |
| Recovered monomer, weight percent | 13.3 | 6.0 | 8.2 | 11.4 | 12.4 | 11.3 | 10.5 | |
| Unaccounted for, weight percent | 3.7 | 10.6 | 9.4 | 11.2 | 10.2 | 11.6 | 3.3 | 6.1 |

[1] 800 p.s.i.g.
[2] Inhibitor removed from vinyl acetate.
[3] 5 U.S. gallons reactor.
[4] 50/50 blend of virgin and cat. cracked gas oils, pour +20° F.

The principal advantages of these operations were improved quality of pour depressant and substantially reduced solvent requirement. This latter factor resulted not only in a reduction of solvent required, but also in much higher utilization of reactor volume. See Table VI.

TABLE VI

*Synthesis of Pour Depressants*

| Conditions: | | | |
|---|---|---|---|
| Vinyl acetate addition | (1) | (1) | (2) |
| Di-t-butylperoxide addition | (1) | (2) | (2) |
| Product: | | | |
| Yield, g./USG reactor space | 342 | 530 | 1,340 |
| Yield, g./g. peroxide | 23 | 44.5 | 46.9 |
| Benzene, g./g. polymer | 5 | 2.3 | 1 |
| Vinyl acetate polymerized, weight percent | 66 | 83 | 94 |
| Pour Depression, °F.,³ 0.05 weight percent | 60 | 60 | 90 |

¹ At start.   ² Continuous.
³ 50/50 blend of virgin gas oil and cat. cracked gas oil, ASTM pour +20 °F.

Figure 5:
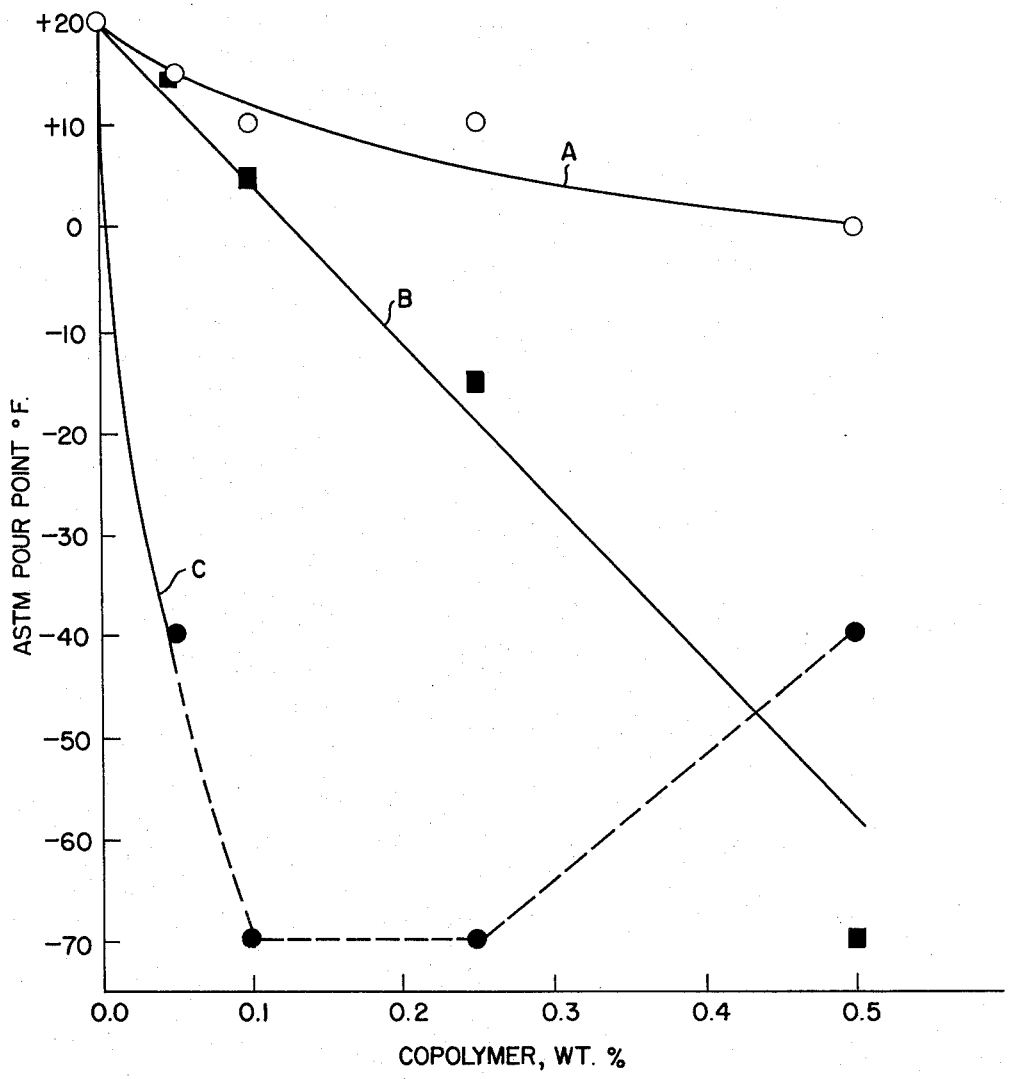

Reference is made to FIGURE 5 which illustrates the effect of pressure at which the copolymer is produced on its activity as pour depressants. The polymers obtained at pressures lower than about 600 p.s.i.g. show little promise as pour depressants. As the molecular weight is proportional to pressure during the synthesis, this illustrates that the copolymer must have a certain minimum molecular weight to be effective as a pour depressant.

Figure 6:
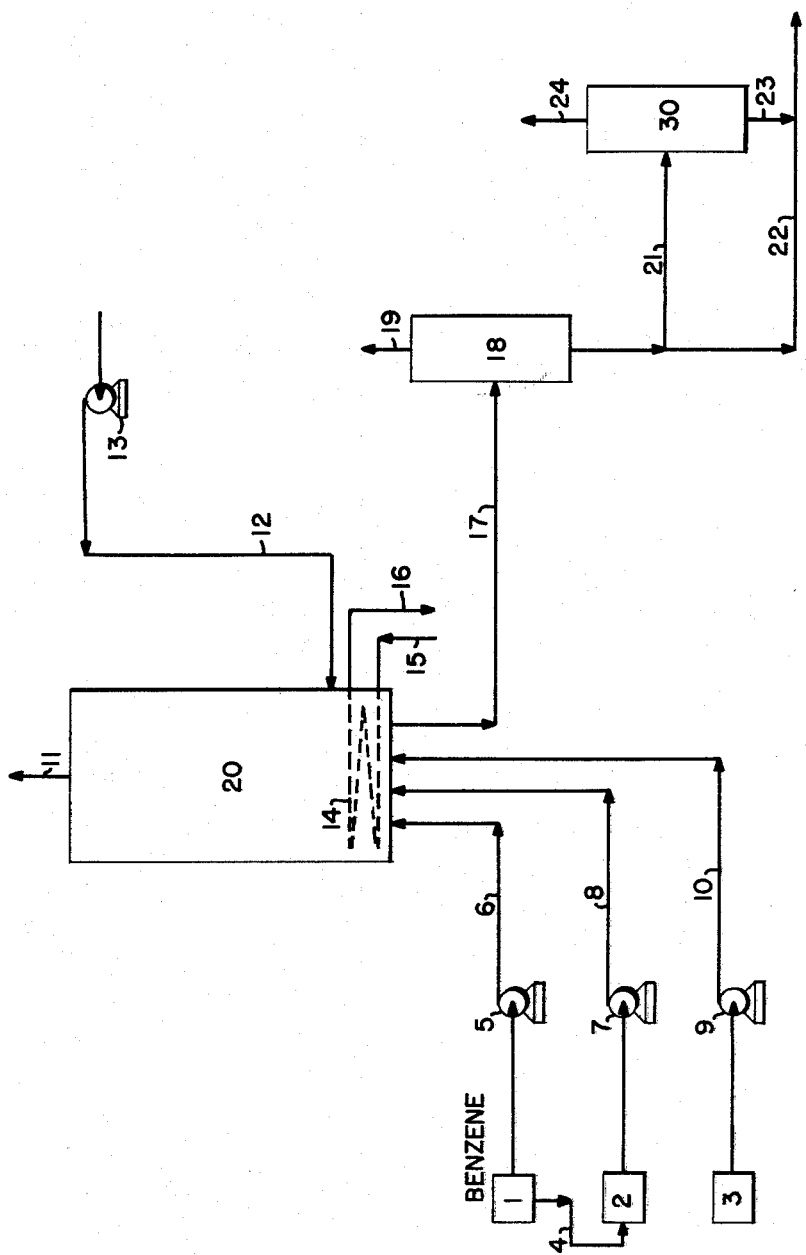

A typical method for conducting a polymerization of the present invention is illustrated in FIGURE 6. Referring specifically to FIGURE 6, reactor 20 is first purged with nitrogen, introduced by means of line 12 and pump 13. Reactor 20 is then purged with ethylene which is introduced by means of line 12 and pump 13. Gases are removed from reactor 20 by means of line 11. The reactor is maintained at a positive pressure in the range from about 50 to 100 pounds absolute.

Approximately 220 parts by weight of benzene is introduced into reactor 20 from benzene storage 1 by means of line 6 and pump 5. Reactor 20 is then raised to a temperature of 300° F. by means of heating element 14 wherein a heating fluid or equivalent is introduced by means of line 15 and withdrawn by means of line 16. Reactor 20 is held at 300° F. during the course of the reaction by the removal of heat or by the addition of heat thereto. Ethylene is introduced by means of line 12 so as to raise the pressure of the reactor to about 900 pounds.

The addition of vinyl acetate and of di-tertiary-butyl-peroxide is started concurrently. The vinyl acetate is withdrawn from storage zone 3 and introduced into the reactor by means of line 10 and pump 9. Approximately 55 parts by weight of vinyl acetate is added over a two hour period. The peroxide is introduced by passing benzene into storage zone 2 by means of line 4 and then introducing the solution into the reactor 20 by means of line 8 and pump 7. Approximately 5.5 parts by weight of peroxide are combined with 16.5 parts by weight of benzene. The resulting 22 parts by weight of 25% peroxide solution in benzene is added to reactor 20 over a three hour period.

After the addition of the peroxide has been completed, the reactor is held for an additional one-half hour at a temperature of about 300° F. The ethylene is added continuously so as to maintain the pressure at about 900 pounds. In operation, approximately 934 parts by weight of vinyl acetate are used in conjunction with from about 2,800 to 3,800 parts by weight of ethylene.

At the end of the reaction, the reactor is allowed to cool to about 160° F. and the reaction product is then withdrawn by means of line 17 and passed into separation zone 18. Excess ethylene is removed overhead from separation zone 18 by means of line 19. The polymer product comprising the copolymer in a benzene solution may be withdrawn by means of line 22 and further handled as desired. Under certain instances, it may be desirable to separate at least a portion of the benzene from the copolymer. Under these conditions, the benzene copolymer product is passed to separation zone 30 by means of line 21. Benzene is removed overhead by means of line 24, while a copolymer product is withdrawn by means of line 23.

The quantity mentioned above may be somewhat varied. For example, based upon 55 parts by weight of vinyl acetate, the amount of benzene utilized may vary from about 180 to 300 parts by weight, and the amount of di-tertiary-butyl-peroxide may vary from about 3 to 8 parts by weight. Also as mentioned, the amount of ethylene utilized varies from about 2,800 to 3,800 parts by weight, or approximately 938 parts by weight of vinyl acetate. The time of reaction also may be varied from about 2 to 4 hours, depending upon other operating variables.

What is claimed is:
1. Process for the manufacture of a pour depressant comprising a copolymer of ethylene and vinyl acetate which comprises introducing ethylene into a reaction zone containing a benzene solvent, thereafter raising the temperature of said reaction zone to a temperature in the range from 280° to 340° F. and to a pressure in the range from 700 to 2000 pounds per sq. in., thereafter adding to said reaction zone vinyl acetate and sufficient ethylene to maintain the pressure in said range, carrying out said reaction from a period of at a temperature in the range from 280° to 340° F. for 2 to 16 hours under conditions wherein the concentration of the vinyl acetate in the benzene solution varies from about 0.2 to 10.0%, whereby a polymer having a molecular weight in the range from about 1000 to 3000 is secured, wherein the concentration of the vinyl acetate in the product will vary from about 15 to 28% by weight.

2. Process for the manufacture of a pour depressant for middle distillates comprising a copolymer of ethylene and vinyl acetate which comprises introducing about 220 parts by weight of benzene into a reaction zone, raising the temperature of said reaction zone to about 300° F., raising the pressure of said reaction zone to about 900 pounds by the introduction of ethylene, introducing vinyl acetate and a peroxy compound simultaneously into said reaction zone, under conditions where about 55 parts by weight of vinyl acetate is introduced into said reaction zone over a two hour period and under conditions wherein about 5.5 parts by weight of said peroxy compound diluted with 16.5 parts by weight of benzene is introduced into said reaction zone over about a 3 hour period, maintaining the temperature of said reaction zone at about 300° F. during the addition of said peroxy compound and said vinyl acetate maintaining the pressure of said reaction zone at about 900 pounds by the continuous addition of ethylene, maintaining temperature at 300° F. and the pressure at 900 pounds for approximately one-half hour after discontinuing the addition of said peroxy compound, thereafter allowing said reaction zone to cool and the pressure to be reduced and recovering said polymer therefrom.

3. Process as defined by claim 2 wherein said peroxy compound is ditertiary butyl peroxide.

References Cited in the file of this patent
UNITED STATES PATENTS

| 2,200,429 | Perrin et al. | May 14, 1940 |
| 2,396,785 | Hanford | Mar. 19, 1946 |
| 2,947,735 | Bartl | Aug. 2, 1960 |

OTHER REFERENCES

Wiles et al.: "Di-tert-butyl Peroxide and 2,2-Bis (tert-butyl-peroxy)butone," Ind. Eng., volume 41, No. 8, pages 1679–1682.